Dec. 1, 1931.  P. A. SCHREINER  1,834,653
HYDRAULIC TRANSMISSION
Filed July 23, 1931  2 Sheets-Sheet 1

Inventor
P. A. Schreiner
By Clarence A. O'Brien
Attorney

Dec. 1, 1931. P. A. SCHREINER 1,834,653
HYDRAULIC TRANSMISSION
Filed July 23, 1931   2 Sheets-Sheet 2

Inventor
P. A. Schreiner
By Clarence A. O'Brien
Attorney

Patented Dec. 1, 1931

1,834,653

UNITED STATES PATENT OFFICE

PAUL AUGUST SCHREINER, OF LINCOLN, NEBRASKA

HYDRAULIC TRANSMISSION

Application filed July 23, 1931. Serial No. 552,738.

This invention relates generally to transmissions and more particularly to new and useful improvement in hydraulic transmission for use on motor vehicles and has for one of its important objects to provide, in a manner as hereinafter set forth, a device of this character embodying a novel construction, combination and arrangement of parts through the medium of which any desired speed may be had within a given range and which may be conveniently operated by the driver of the vehicle.

Other objects of the invention are to provide a hydraulic transmission which will be simple in construction, strong, durable, efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
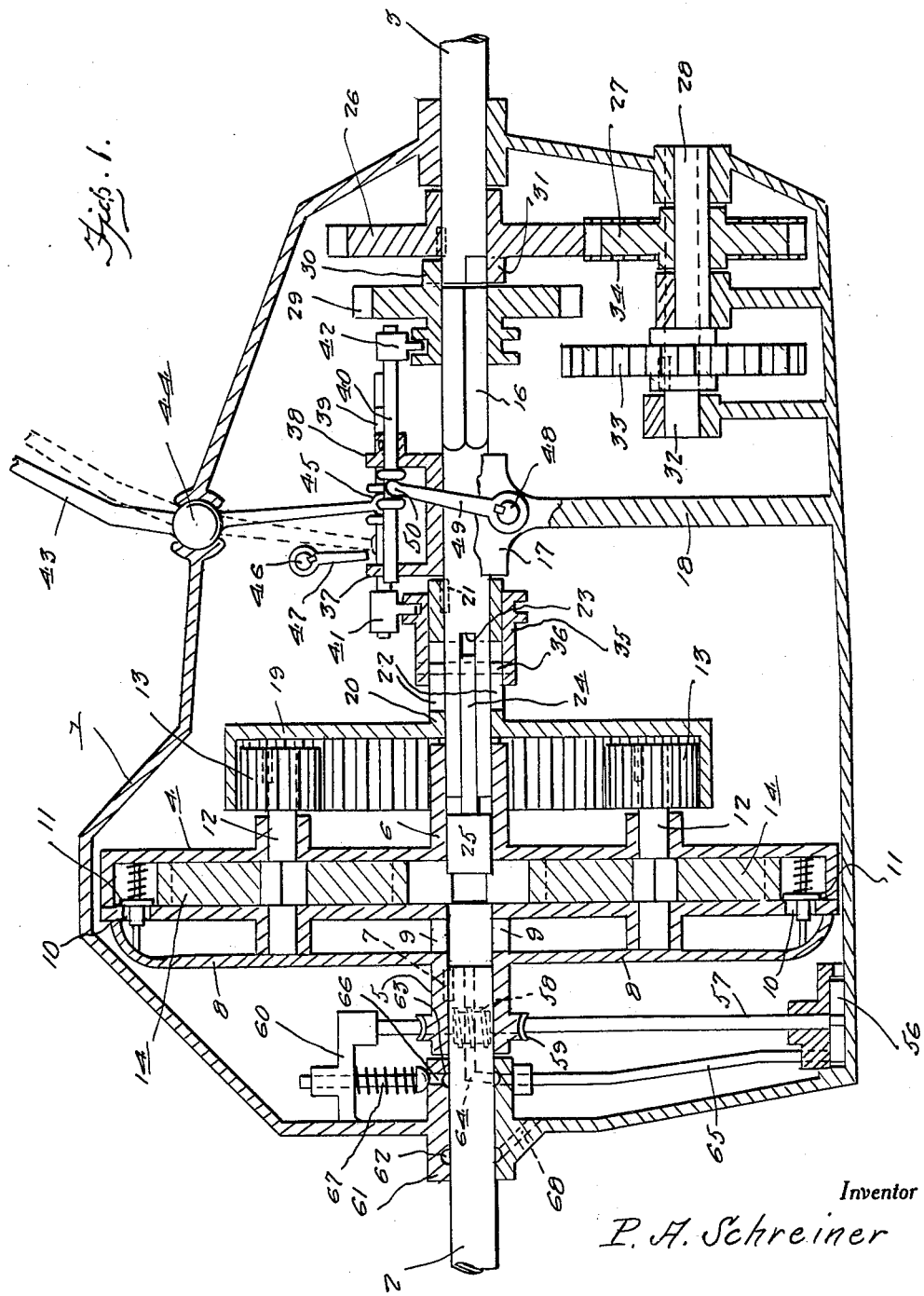
Figure 1 is a view in vertical longitudinal section through a hydraulic transmission in accordance with this invention.

Referring now to the drawings in detail, it will be seen that the reference numeral 1 designates the transmission housing into the forward end of which the shaft 2 from the engine of the vehicle rotatably extends. The reference numeral 3 designates a drive shaft of the vehicle which extends rotatably into the rear end of the housing 1.

Fixed on the inner end portion of the shaft 2 for rotation therewith in the housing 1 is a casing 4 having formed integrally therewith a forwardly projecting sleeve 5 which receives the shaft 2 and a rearwardly projecting sleeve 6 the purpose of which will be presently set forth. The sleeve 5 is keyed to the shaft 2, as at 7. The sleeves 5 and 6 are disposed centrally on the casing 4 and have communication therewith. Also formed integrally with the casing 4 on the forward side thereof are the oil conduits 8 having communication with the sleeve 5 at their inner ends through the passages 9. It may be well to here state that the rear end portion of the sleeve 5 is free of the shaft 2. At their outer ends the conduits 8 communicate with the interior of the casing 4 through ports 10 which are provided with the spring seated slidably mounted check valves 11, said check valves being operable in the casing 4.

Figure 2:
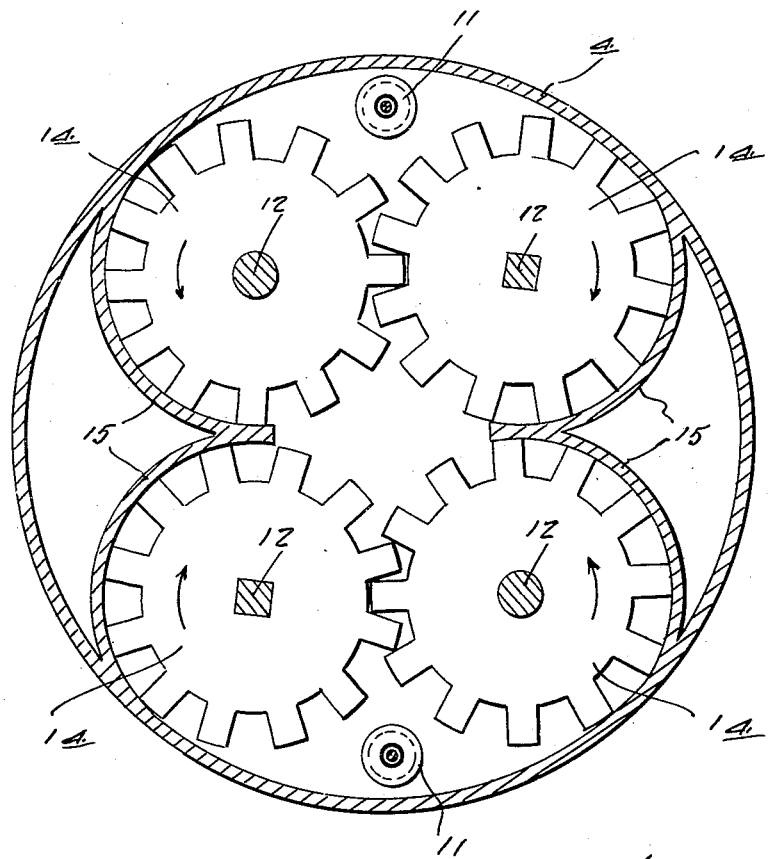
Figure 2 is a view in vertical cross section through the oil controlled unit.
Figure 3:
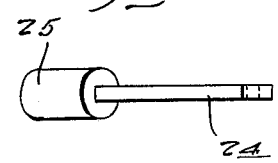
Figure 3 is a detail view in perspective of the slidable oil control valve.
Figure 4:
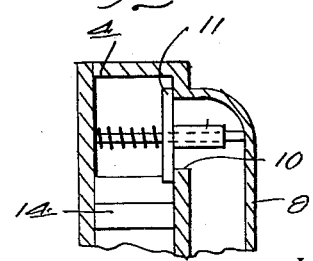
Figure 4 is a fragmentary view in section showing one of the check valve controlled oil ports.

Pairs of shafts 12 are journaled in the casing 4 and one of each pair project rearwardly therefrom and have fixed on their rearwardly projecting end portions the gears 13. Pump gears 14 are fixed on the shafts 12 within the casing 4, said pump gears being provided in meshed pairs, as illustrated to advantage in Figure 2 of the drawings. Walls or pockets 15 are provided in the casing 4 and enclose the outer portions of the pump gears 14.

A shaft 16 is journaled in a bearing 17 on a suitable support 18 in an intermediate portion of the housing 1 and fixed on the forward portion of said shaft 16 is an internally toothed annular gear 19 with which the gears 13 are operatively engaged at all times. The rear end portion of the shaft 16 is of polygonal cross section. The annular gear 19 is provided with a hub portion 20 through which the shaft 16 extends, said hub portion being keyed on said shaft 16, as at 21. The hub portion 20 is provided with diametrically opposite longitudinal slots 22 which register with a slot in the shaft 16.

The shaft 16 is provided with a bore 23 extending thereinto from its forward end which slidably receives the stem 24 of a slidable oil control valve 25. The forward end portion of the shaft 16 is disposed rotatably in the rear end portion of the sleeve 6 of the casing 4. The valve 25, when in its retracted or inoperative position, is disposed in the forward portion of the sleeve 6 and said valve 25 is adapted to be moved forwardly through the casing 4 into the rear end portion of the sleeve 5 in a manner to close the passages 9 to the conduits 8 and to break communication of the sleeve 5 with the casing 4.

The shafts 2, 16 and 3 are in longitudinal alignment with each other. Fixed on the inner end of the shaft 3 is a gear 26 which is constantly in mesh with a gear 27 which is rotatably mounted on the counter-shaft 28 in the housing 1. A gear 29 is slidably mounted on the polygonal rear end portion of the shaft 16 for rotation with said shaft and is provided with clutch members 30 which engage complementary clutch members 31 on the gear 26 for connecting the shaft 16 directly to the shaft 3. The reference numeral 32 designates a comparatively long countershaft in the housing 1 upon which the gears 33 and 34 are fixed. The gear 34 is constantly in mesh with the gear 27 and the gear 33 is adapted for engagement and actuation by the gear 29 when said gear 29 is slid forwardly on the shaft 16 out of engagement with the gear 26. A collar 35 is slidably mounted on the hub portion 20 of the annular gear 19 and is operatively connected to the stem 24 of the slidable valve 25 by a pin 36 which is operable in the slots 22 of the hub portion 20 and in the slot provided therefor in the shaft 16. Ears 37 and 38 rise from the bearing 17 and have slidably mounted therein the shift rods 39 and 40. At its forward end, the shift rod 39 is operatively connected to the collar 35, as at 41, and the shift rod 40 is operatively connected, at its rear end, to the slidable gear 29, as at 42. A hand lever 43 extends into the housing 1 through the top thereof and is mounted for swinging movement, as at 44. The lower end of the hand lever 43 is operatively connected to an intermediate portion of the rod 39 between the ears 37 and 38, as at 45. A horizontal shaft 46 extends rotatably into the housing 1 and has fixed on its inner end portion an arm 47 which is operatively engageable with the lower end portion of the hand lever 43 when said hand lever is in the position indicated in broken lines in Figure 1 for returning said hand lever to its inoperative position and for shifting the valve 25 to its open position. The shaft 46 is operatively connected to a foot pedal (not shown) by any suitable means. The reference numeral 48 designates another shaft which is horizontally disposed and rotatably mounted in the housing 1, said shaft 48 having fixed thereon an arm 49 which is operatively engaged with the rod 40 as at 50. The shaft 48 is operatively connected to a hand lever (not shown) located within convenient reach of the operator of the vehicle by any suitable means.

Figure 5:
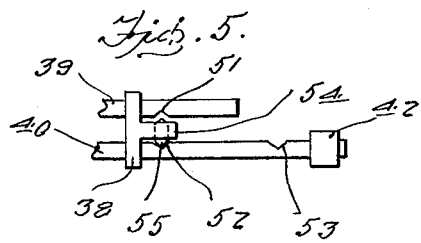
Figure 5 is a detail view in top plan of the safety lock device.

Referring now to Figure 5 of the drawings, it will be seen that the rod 39 is provided, in its rear portion, with a notch 51 and the rear portion of the rod 40 is provided with longitudinally spaced notches 52 and 53. An arm 54 extends rearwardly from the ear 38 between the rods 39 and 40 and is provided with a transverse opening in which is slidably mounted a locking pin 55 which is engageable in the notches 51, 52 and 53. The locking pin 55 is operable by one of the shift rods in a manner to engage the same in the notches of the other of the said shift rods.

The reference numeral 56 designates an oil pump in the lower forward portion of the housing 1, said pump being driven by a shaft 57 having a worm gear 58 thereon which meshes with a worm gear 59 on the forward portion of the sleeve 5. A bracket 60 extends rearwardly from the forward wall of the housing 1 and is provided with a bearing on its rear end in which the upper end of the shaft 57 is journaled. The lower end portion of the shaft is, of course, journaled in the housing of the pump 56.

The reference numeral 61 designates a bearing provided for the shaft 2. Said bearing having oil grooves 62 and 63 therein. The shaft 2 is provided with an angular duct 64 communicating, at one end, with the oil groove 63 and extending therefrom the rear end of said shaft 2 and communicating with the interior of the rear portion of the sleeve 5. An oil pipe 65 extends from the pump 56 to the oil groove 63 and through the medium of said oil groove 63 communicates with the duct 64. An outlet passage 66 for excess oil is provided in the bearing 61, said outlet passage communicating with the oil groove 63. A spring seated valve 67 is slidably mounted on the bracket 60 for engagement over the outlet passage 66. Excess oil may return to the housing 1 from the oil groove 62 through a duct 68.

In use, when the valve 25 is disposed in its retracted position as seen in Figure 1 of the drawings, the shaft 16 is disconnected from the shaft 2. When this shaft 2 is being rotated by the engine of the vehicle the oil in the casing 4 is free to circulate, said oil being drawn in from the conduits 8 through the openings 10 past the check valves 11 and is driven toward the center of the casing by the pump gears 14, said oil passing into the rear portion of the sleeve 5 from the central portion of the casing 4 and again entering the conduits 8 through the passages 9.

The gears 13 simply roll around the interior of the annular gear 19, said annular gear 19 being stationary with the result that the gears 13 are rotated thereby for rotating the pump gears 14, thus circulating the oil in the casing as above set forth.

When it is desired to move the vehicle, the gear 29 is engaged with the gear 26 to directly connect the shafts 16 and 3 and the hand lever 43 is then swung to the position indicated in broken lines in Figure 1 to shift the rod 39, thereby moving the valve 25 forwardly through the casing 4 into the rear end portion of the sleeve 5 and in this manner breaking communication between the casing 4 and the sleeve 5 and the conduits 8. It will thus be seen that the oil in the casing 4 which is being impelled toward the center of said casing by the gears 14 cannot escape with the result that the gears 14 will be locked against rotation, thereby holding the gears 13 stationary and connecting the annular gear 19 to the casing 4 for rotation therewith. Of course, any desired relative movement between the shafts 2 and 16 may be had by regulating the valve 25 relative to the sleeve 5 to permit the passage or circulation of any desired quantity or portion of the oil in the casing 4.

The oil pump 56 simply keeps the casing 4 full at all times, compensating for leakage which may occur at the bearings provided for the shafts 12 and 16. The pump 56 also lubricates the forward bearing 61. Excess oil from the pump 56 which is pumped into the oil groove 63 of the bearing 61 escapes through the passage 66 by opening the valve 67. Of course, a portion of the oil will pass through the duct 54 to replenish the supply in the casing 4.

Reverse movement of the vehicle is had by disengaging the gear 29 from the gear 26 and engaging said gear 29 with the gear 33 which is operatively connected to the gear 26 by the shaft 32, the gear 34 and the gear 27.

The valve 25 may be moved rearwardly toward its open position by the foot of the operator of the vehicle through the medium of the arm 47 on the shaft 46, said arm 47 as hereinbefore explained, being engageable with the lower end portion of the hand lever 43 in a manner to shift said hand lever from the position indicated in broken lines in Figure 1 to the position shown in full lines in said Figure 1.

The locking pin 55 positively prevents shifting of the gear 29 while the shaft 16 is operatively connected to the shaft 2 and also prevents the valve 25 from being closed while the gear 29 is being shifted. When the valve 25 is open and the rod 39 is in its rearmost position, the pin 55 will be engaged in the notch 51 when the rod 40 is actuated to shift the gear 29, thereby positively preventing movement of the rod 39. When the rod 39 moves forwardly and the valve 25 is closed, said rod 39 shifts the pin 55 into either of the notches 52 or 53 to positively prevent movement of the rod 40. This constitutes a most important and desirable feature of the invention.

It is believed that the many advantages of a hydraulic transmission constructed in accordance with this invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A hydraulic transmission comprising a housing, a drive shaft extending rotatably into one end of the housing, a driven shaft extending rotatably into the other end of the housing, an intermediate shaft rotatably mounted in the housing, said shafts being longitudinally aligned, an internal annular gear fixed on the intermediate shaft, a casing, oppositely projecting sleeves extending centrally from the casing and having communication therewith, one of said sleeves being fixed on the drive shaft for mounting the casing thereon for rotation therewith, oppositely extending oil conduits on the casing communicating, at one end, with said one sleeve for receiving oil therefrom, and at their other ends with the outer portion of the casing for delivering the oil thereinto, pairs of pump gears mounted in the casing for impelling the oil inwardly toward said one sleeve, gears connected with the pairs of pump gears and in mesh with the annular gear for connecting the intermediate shaft to the drive shaft for actuation thereby when the pump gears are locked against rotation, a valve slidably mounted in the other sleeve and engageable in said one sleeve for controlling the circulation of oil through the casing and the conduits, means for operating the valve, and means for connecting the driven shaft to the intermediate shaft for actuation thereby.

2. A hydraulic trasmission comprising a housing, a driving shaft extending rotatably into one end of the housing, a driven shaft extending rotatably into the other end of the housing, an intermediate shaft rotatably mounted in the housing, said shafts being longitudinally aligned, an internal annular gear fixed on the intermediate shaft, a casing, oppositely projecting sleeves extending centrally from the casing and having communication therewith, one of said sleeves extending over the drive shaft and being fixed thereto for mounting the casing thereon for rotation therewith, the other of the sleeves rotatably receiving one end portion of the intermediate shaft, oppositely extending oil conduits mounted on the casing and communicating, at one end, with said one sleeve, and at their other ends with the outer portion of the casing, said casing having ports establishing communication between the same and said other ends of the conduits, spring seated check valves operable in the casing and controlling the ports, pairs of pump gears in the casing for impelling the oil inwardly toward said one sleeve, gears connected with the pairs of pump gears and in mesh with the annular gear for connecting the intermediate shaft to the drive shaft for actuation thereby when the pump gears are locked against rotation, a valve slidably mounted in said other sleeve and movable through the casing into said one sleeve for controlling the circulation of oil between the casing and the conduits, means for connecting the driven shaft to the intermediate shaft for actuation thereby, and means for actuating the valve.

3. A hydraulic transmission comprising a housing, a driving shaft extending rotatably into one end of the housing, a driven shaft extending rotatably into the other end of the housing, an intermediate shaft rotatably mounted in the housing, said shafts being longitudinally aligned, an internal annular gear fixed on the intermediate shaft, a casing, oppositely projecting sleeves extending centrally from the casing and having communication therewith, one of said sleeves extending over the drive shaft and being fixed thereto for mounting the casing thereon for rotation therewith, the other of the sleeves rotatably receiving one end portion of the intermediate shaft, oppositely extending oil conduits mounted on the casing and communicating, at one end, with said one sleeve, and at their other ends with the outer portion of the casing, said casing having ports establishing communication between the same and said other ends of the conduits, spring seated check valves operable in the casing and controlling the ports, pairs of pump gears in the casing for impelling the oil inwardly toward said one sleeve, gears connected with the pairs of pump gears and in mesh with the annular gear for connecting the intermediate shaft to the drive shaft for actuation thereby when the pump gears are locked against rotation, a valve slidably mounted in said other sleeve and movable through the casing into said one sleeve for controlling the circulation of oil between the casing and the conduits, means for connecting the driven shaft to the intermediate shaft for actuation thereby, and means for actuating the valve, the intermediate shaft having a bore extending thereinto from one end and further having a diametrically extending slot intersecting the bore, the last named means including a stem connected to the valve and disposed slidably in the bore, a hub portion formed integrally with the annular gear and journaled on the intermediate shaft, said hub portion having diametrically opposite slots therein communicating with the slot in the intermediate shaft, a collar slidably mounted on the hub portion, a pin operable in the slots and connecting the stem to the collar, a slidably mounted rod in the housing operatively connected to the collar, and manually actuating means for shifting the rod.

4. A hydraulic transmission comprising a housing, a drive shaft extending rotatably into one end of the housing, a driven shaft extending rotatably into the other end of the housing, an intermediate shaft rotatably mounted in the housing, said shafts being longitudinally aligned, an internal annular gear fixed on the intermediate shaft, a casing, oppositely projecting sleeves extending centrally from the casing and having communication therewith, one of said sleeves being fixed on the drive shaft for mounting the casing thereon for rotation therewith, oppositely extending oil conduits on the casing communicating, at one end, with said one sleeve for receiving oil therefrom, and at their other ends with the outer portion of the casing for delivering the oil thereinto, pairs of pump gears mounted in the casing for impelling the oil inwardly toward said one sleeve, gears connected with the pairs of pump gears and in mesh with the annular gear for connecting the intermediate shaft to the drive shaft for actuation thereby when the pump gears are locked against rotation, a valve slidably mounted in the other sleeve and engageable in said one sleeve for controlling the circulation of oil through the casing and the conduits, means for operating the valve, and means for connecting the driven shaft to the intermediate shaft for actuation thereby, and means for locking the first named means against operation when the second named means is being actuated, and for locking said second named means against operation when the first named means is being actuated.

5. A hydraulic transmission comprising a housing, a drive shaft extending rotatably into one end of the housing, a driven shaft extending rotatably into the other end of the housing, an intermediate shaft rotatably mounted in the housing, said shafts being longitudinally aligned, an internal annular gear fixed on the intermediate shaft, a casing, oppositely projecting sleeves extending centrally from the casing and having communication therewith, one of said sleeves being fixed on the drive shaft for mounting the casing thereon for rotation therewith, oppositely extending oil conduits on the casing communicating, at one end, with said one sleeve for receiving oil therefrom, and at their other ends with the outer portion of the casing for delivering the oil thereinto, pairs of pump gears mounted in the casing for impelling the oil inwardly toward said one sleeve, gears connected with the pairs of pump gears and in mesh with the annular gear for connecting the intermediate shaft to the drive shaft for actuation thereby when the pump gears are locked against rotation, a valve slidably mounted in the other sleeve and engageable in said one sleeve for controlling the circulation of oil through the casing and the conduits, means for operating the valve, and means for connecting the driven shaft to the intermediate shaft for actuation thereby, a pump mounted in the housing and connected with the casing for supplying oil thereto from the housing, and means oppositely connecting the pump to said one sleeve for actuation thereby.

In testimony whereof I affix my signature.

PAUL AUGUST SCHREINER.